Jan. 28, 1941.  J. A. KAMPER  2,229,927
ELECTRICAL TESTER
Filed Sept. 2, 1939  2 Sheets-Sheet 1

INVENTOR.
Joe A. Kamper
BY Lancaster, Alwine and Rommel
ATTORNEYS.

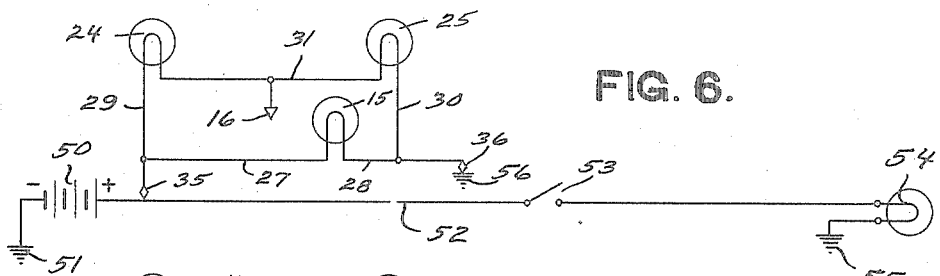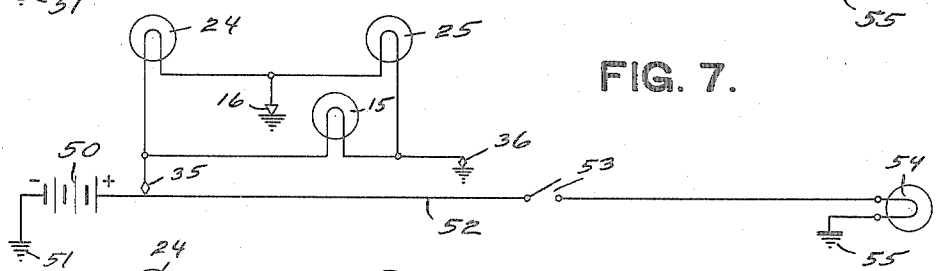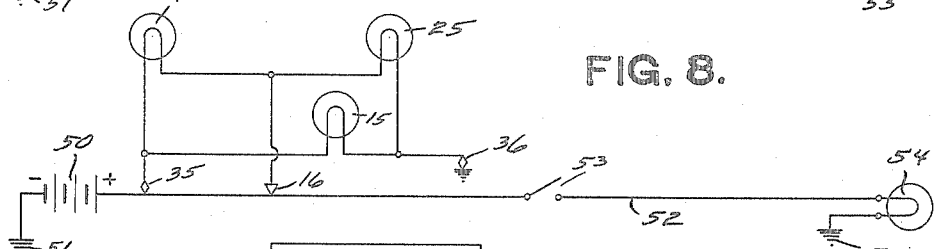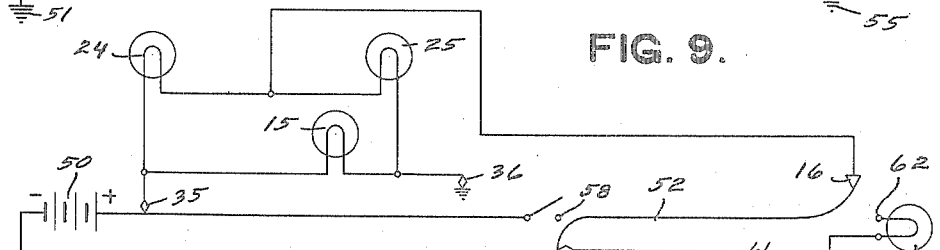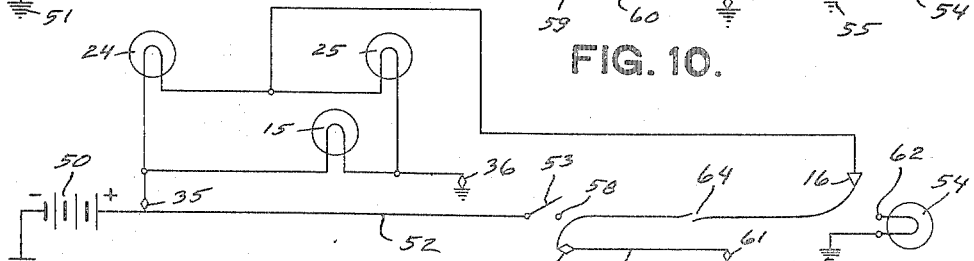

Patented Jan. 28, 1941

2,229,927

UNITED STATES PATENT OFFICE 2,229,927

ELECTRICAL TESTER

Joe A. Kamper, Fort Morgan, Colo.

Application September 2, 1939, Serial No. 293,286

5 Claims. (Cl. 175—183)

The present invention relates to electrical testers and the primary object of the invention is to provide a simple compact tester in the form of a portable hand tool which is especially well adapted for use in checking electrical systems of motor vehicles and the like.

A further object of the invention is to provide a tester of simple and rugged construction whereby a layman may conduct reliable tests and easily locate trouble in electrical systems without requiring extensive knowledge of electricity.

A further object is to provide a simple test tool of this character embodying visual indicators which will indicate to the user such conditions as ground, battery, open, short circuits, continuity, etc. thru merely connecting the device for the particular test desired.

A further object resides in the novel formation of the tester permitting its easy use in close places, and also the means for illuminating the apparatus under test, as well as use of this illuminating means for general lighting purposes exclusive of the visual test lights when desired.

Other objects and advantages of the invention will be apparent from the following detailed description, taken in connection with the accompanying drawings and in which drawings.

Figure 1:
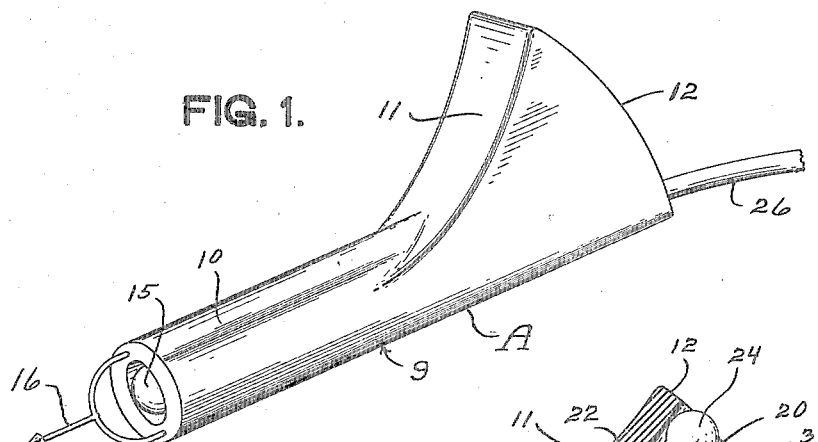
Figure 1 is a perspective view of the tester.
Figure 2:
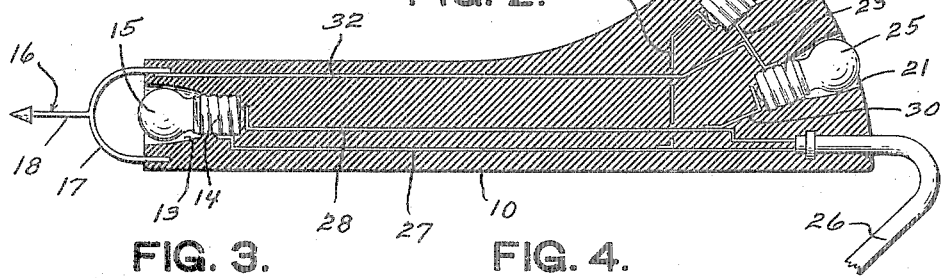
Figure 2 is a central longitudinal section thru the tester.
Figure 3:
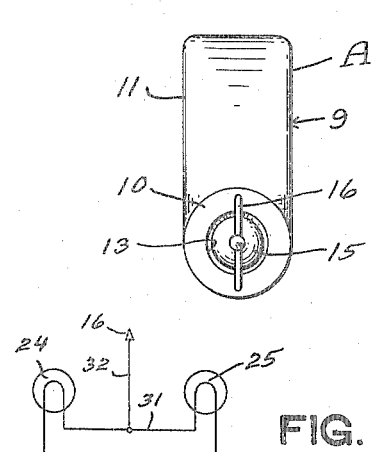
Figure 3 is an end view looking at the test prod end of the tester.

Figures 6 to 10 inclusive are wiring diagrams illustrating various tests which may be made with the tester.

Referring to the drawings in detail and wherein like reference characters designate corresponding parts thruout the several views, the tester A comprises a moulded one-piece body 9 providing a cylindrical shank portion 10 having a flat segmental-shaped head 11 at its rear end which extends laterally to one side of the shank portion and provides an arcuate rearwardly facing indicator face 12. The body 9 may be moulded of any suitably hard insulating material and this body forms a support or carrier for the electrical means of the tester.

Provided axially in the forward end of the shank 10 is a forwardly opening bell-shaped pocket 13 at the base of which is a lamp socket 14 moulded into the material of the body 9 axially of the shank portion 10. Received in this socket 14 is a preferably white lamp 15 providing an illuminating lamp adapted to shine forwardly of the tester upon the object being worked on. The bulb of the lamp 15, as will be observed, is received in a protected position in the pocket 13, this pocket also acting as a shield to deflect the light forwardly of the tester.

Carried by the forward end of the shank portion 10 is a metal test prod 16 embodying a U-shaped securing portion 17 having the ends of its two arms embedded in the material of the body 9 at diametrically opposite sides of the pocket 13, and a prod stem 18 extending from the bowed portion of the securing portion axially of the shank 10.

Figure 4:
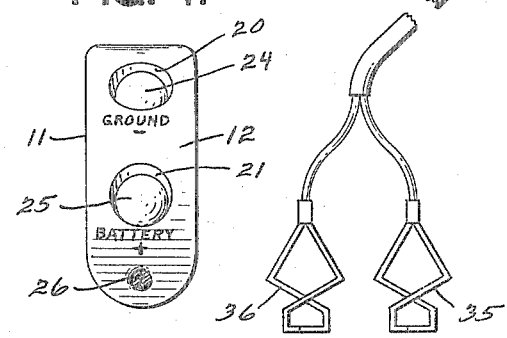
Figure 4 is an end view looking at the head or indicator end of the tester.

Opening rearwardly in spaced relation upon the arcuate indicator face 12 are two bell-shaped pockets 20 and 21 provided respectively at their base with lamp sockets 22 and 23 which are held in place by being moulded into the material of the body 9. Received in the socket 22 is a preferably green test lamp 24, while received in the socket 23 is a preferably red test lamp 25. These test or indicator lamps 24 and 25 are protected within their respective pockets 20 and 21 and are clearly visible to an operator facing the rear end of the tester. In addition to this different coloring of the test lamps 24 and 25, the arcuate indicator face 12 may bear the designating indicia as shown in Figure 4 to indicate the lamp 24 as Ground or — and the lamp 25 as Battery or +. These test or indicator lamps 24 and 25 provide visual indicators of the condition of the circuit under test.

Referring now to the manner in which the lamps 15, 24 and 25 are connected in circuit, the conductors are preferably embedded in the body 9 during the molding of the body. A two wire rubber covered conductor 26 which may vary in length, has one end suitably secured in the rear end of the body 9 and projects from the arcuate indicator face 12. Within the body 9, the two wires of the conductor 26 separate, one wire being connected by the conductor 27 to the shell of the socket 14, and the other wire being connected by the conductor 28 to the center terminal of the socket 14. A conductor 29 connects the conductor 27 with the center terminal of the socket 22, while a conductor 30 connects the conductor 28 with the center terminal of the socket 23. A conductor 31 connects the shells of the sockets 22 and 23. This conductor 31 is connected by a conductor 32 to one arm of the metal test prod 16. Thus it will be seen that the lamp 15 is connected in parallel with the lamps 24 and 25 and that the lamps 24 and 25 are connected in series with each other, with the test prod 16 connected between the test lamps 24 and 25. With this arrangement, the lamp 15 may be used for lighting purposes whenever desired without effecting operation of the test lamps 24 and 25. When the lamp 15 is not required, the bulb may be partially turned out of its socket 14.

At the free end of the two wire conductor 26, the wires are separated and provided with suitable clips 35 and 36 whereby these leads may be readily attached to elements under test. If so desired, the clip 35 may be designated Battery or +, while the clip 36 may be designated Ground or −.

Figure 5:
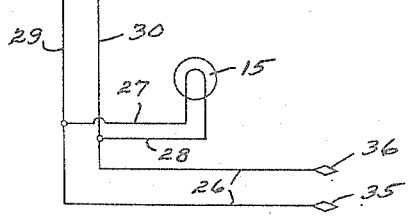
Figure 5 is a wiring diagram of the tester.

Referring to the circuit diagram of Figure 5, when the clips 35 and 36 are connected across a source of electrical energy, such as the battery of a motor vehicle for instance, the test lamps 24 and 25 thru being connected in series will both burn dimly and give a visual indication that the tester is in proper operating condition for testing. The illuminating lamp 15 will also light if turned into its socket. While the tester may be used for testing various electrical circuits and apparatus as will be readily apparent, in Figures 6 to 10 inclusive are shown arrangements for making certain tests on the electrical systems of motor vehicles employing the single wire return system. In these figures, the numeral 50 may designate the vehicle battery having its negative side grounded as at 51 and its positive side connected by the conductor 52 thru a switch 53 with a headlight lamp 54 having one side grounded as at 55.

Figure 6 shows the tester hooked up for testing, the battery or positive clip 35 having been connected with the conductor 52 as by connecting this clip 35 with the ammeter post (not shown) and the ground or negative clip 36 connected to a ground 56 such as the frame of the vehicle. Both test lamps 24 and 25 will now burn dimly and the tester is ready for use.

With the tester thus hooked up, the point of the test prod 16 is then touched against a wire or other piece of apparatus to be tested for conductivity. If the test prod 16 touches a ground, as in Figure 7, the green test lamp 24 designated ground will burn brightly while the red test lamp 25 designated battery will be shunted out and visually indicate that the test prod is touching a ground. Should the test prod 16 be touched against a point which is conductive with the positive of the battery as in Figure 8, the red test lamp 25 designated battery will burn brightly while the green test lamp 24 designated ground will be shunted out and visually indicate that the test prod is touching a battery connection. If during either of these tests both lamps 24 and 25 remain dimly lighted, the test prod is touching a point which is insulated from both battery and ground and indicates an "open."

Figures 9 and 10 indicate use of the tester in making continuity tests. Should it appear that the conductor 52 is broken in two at a point between the switch 53 and lamp 54, the conductor is disconnected from its terminal 58 and a clip 59 on one end of a short lead 60 is clipped to this end of the conductor. A clip 61 at the other end of the lead 16 is then clipped to a ground. The other end of the conductor 52 may then be disconnected from the lamp terminal 62 and the test prod 16 touched to this end of the conductor as in Figure 9. If the conductor 52 is not broken, the green test lamp 24 will light since the tester will have its ground connection thru the conductor under test. If the conductor 52 is broken as at 64 in Figure 10, no change will take place in the tester when the test prod 16 is touched against the end of the conductor and thus indicate an open or break in the conductor 52.

To those skilled in the art it will become readily apparent how various other tests such as testing fuses, lamps, etc., may be carried out with the tester. In use the tester may be held in one's hand in a manner similar to that of holding a pen or pencil when writing, and when so held the two test lights 24 and 25 will be clearly visible to the user.

Changes in detail may be made to the form of the invention herein shown and described without departing from the spirit of the invention or the scope of the following claims.

I claim:

1. An electrical tester comprising a body member, a pair of signal lamps mounted in one end of the body member, a test prod mounted at the other end of the body member, an illuminating lamp mounted in the prod carrying end of the body member, conductors in the body member connecting the signal lamps in series and the illuminating lamp in parallel with the signal lamps, and a conductor connecting the test prod in series between the signal lamps.

2. An electrical tester comprising a body member embodying a shank portion having a head formed at its rear end, a pair of signal lamps mounted in said head and visible rearwardly of the body member, an illuminating lamp mounted in the forward end of said shank portion, a test prod mounted in the forward end of the shank portion, and circuit means in the body member electrically connecting the signal lamps in series and the illuminating lamp in parallel with the signal lamps, and the test prod in series between the signal lamps.

3. In an electrical tester, a moulded body member providing a cylindrical shank portion and a segmental-shaped head at the rear end of the shank portion providing an arcuate indicator face, a pair of signal lamps mounted in the indicator face, a test prod mounted upon the forward end of said shank portion, and conductors embedded in the body member and electrically connecting the signal lamps and test prod in series with the test prod connected between the signal lamps.

4. A tester of the class described, comprising a moulded body member of insulating material providing a cylindrical shank having a segmental-shaped head offset to one side of the rear end of the shank, a pair of lamp receiving pockets opening rearwardly in said head, a signal lamp in each pocket, a pocket opening at the forward end of said shank, an illuminating lamp in said pocket, a test prod mounted in the forward end of the shank, and conductors in the body member connecting the signal lamps in series and the illuminating lamp in parallel with the signal lamps, and the test prod in series between the signal lamps.

5. In an electrical tester, a body member moulded from insulating material to provide a cylindrical shank portion, a segmental-shaped head at the rear end of the shank portion and offset wholly to one side of the shank portion and providing a rearwardly facing arcuate indicator face, a pair of lamp receiving pockets opening at the indicator face, and a lamp receiving pocket opening axially of the forward end of the shank portion.

JOE A. KAMPER.